US011552984B2

(12) United States Patent
Kras

(10) Patent No.: US 11,552,984 B2
(45) Date of Patent: Jan. 10, 2023

(54) SYSTEMS AND METHODS FOR IMPROVING ASSESSMENT OF SECURITY RISK BASED ON PERSONAL INTERNET ACCOUNT DATA

(71) Applicant: KnowBe4, Inc., Clearwater, FL (US)

(72) Inventor: Greg Kras, Dunedin, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/546,676

(22) Filed: Dec. 9, 2021

(65) Prior Publication Data

US 2022/0191233 A1 Jun. 16, 2022

Related U.S. Application Data

(60) Provisional application No. 63/142,071, filed on Jan. 27, 2021, provisional application No. 63/123,812, filed on Dec. 10, 2020.

(51) Int. Cl.
*H04L 9/40* (2022.01)
*G06F 21/62* (2013.01)

(52) U.S. Cl.
CPC ...... *H04L 63/1433* (2013.01); *G06F 21/6245* (2013.01); *H04L 63/1483* (2013.01)

(58) Field of Classification Search
CPC . H04L 63/14; H04L 63/1433; H04L 63/1441; H04L 63/1483
See application file for complete search history.

(56) References Cited

U.S. PATENT DOCUMENTS

| | | | |
|---|---|---|---|
| 8,181,253 B1* | 5/2012 | Zaitsev | H04L 63/1433 726/1 |
| 8,615,807 B1 | 12/2013 | Higbee et al. | |
| 8,635,703 B1 | 1/2014 | Belani et al. | |
| 8,719,106 B2* | 5/2014 | Bachenheimer | G06Q 30/0601 705/26.42 |
| 8,719,940 B1 | 5/2014 | Higbee et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,398,038 B2 | 7/2016 | Higbee et al. | |
| 9,582,780 B1* | 2/2017 | Curcic | H04L 63/1433 |
| 9,591,017 B1 | 3/2017 | Higbee et al. | |

(Continued)

FOREIGN PATENT DOCUMENTS

EP 3 582 468 A1 12/2019
WO WO-2016/164844 A1 10/2016

*Primary Examiner* — Khang Do
(74) *Attorney, Agent, or Firm* — Foley & Lardner LLP

(57) ABSTRACT

Systems and methods are described for improving assessment of security risk based on a user's personal information. Registration of personal information of a user of an organization is received at a security awareness system. Post receiving the registration of the personal information, at least one of an exposure check or a security audit of the personal information of the user is performed by the security awareness system. A personal risk score of the user is then generated or adjusted based at least on a result of one of the exposure check or the security audit.

20 Claims, 8 Drawing Sheets

(56) References Cited

U.S. PATENT DOCUMENTS

| | | | |
|---|---|---|---|
| 9,667,645 B1 | 5/2017 | Belani et al. | |
| 9,674,210 B1* | 6/2017 | Oprea | H04L 63/1425 |
| 9,876,753 B1 | 1/2018 | Hawthorn | |
| 9,912,687 B1 | 3/2018 | Wescoe et al. | |
| 10,243,904 B1* | 3/2019 | Wescoe | H04L 63/1433 |
| 10,536,475 B1* | 1/2020 | McCorkle, Jr. | H04L 63/1425 |
| 10,904,186 B1 | 1/2021 | Everton et al. | |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 2002/0147803 A1* | 10/2002 | Dodd | H04L 63/1433 726/25 |
| 2006/0047725 A1* | 3/2006 | Bramson | H04L 67/306 |
| 2007/0143845 A1* | 6/2007 | Jeong | G06F 21/577 726/22 |
| 2008/0201401 A1* | 8/2008 | Pugh | H04L 63/1441 709/201 |
| 2009/0265209 A1* | 10/2009 | Swaminathan | G06Q 10/06311 705/7.26 |
| 2014/0257962 A1* | 9/2014 | Franzetti | G06Q 30/0231 705/14.27 |
| 2014/0259158 A1* | 9/2014 | Brown | H04L 51/08 726/22 |
| 2015/0264084 A1* | 9/2015 | Kashyap | H04L 63/1483 726/22 |
| 2015/0356316 A1* | 12/2015 | Thompson | G06F 21/00 726/28 |
| 2016/0164898 A1 | 6/2016 | Belani et al. | |
| 2016/0226911 A1* | 8/2016 | Boss | H04L 63/1433 |
| 2016/0301705 A1 | 10/2016 | Higbee et al. | |
| 2017/0222960 A1* | 8/2017 | Agarwal | G06Q 10/107 |
| 2017/0237764 A1* | 8/2017 | Rasumov | G06F 16/24578 726/25 |
| 2017/0244746 A1* | 8/2017 | Hawthorn | H04L 63/1408 |
| 2018/0026996 A1* | 1/2018 | Park | H04L 63/1416 726/23 |
| 2018/0027006 A1* | 1/2018 | Zimmermann | H04L 63/0227 726/11 |
| 2018/0046796 A1* | 2/2018 | Wright | G06F 21/45 |
| 2018/0190146 A1* | 7/2018 | Bodnarium | H04L 63/1441 |
| 2018/0191776 A1* | 7/2018 | Irimie | G06F 40/186 |
| 2018/0255099 A1* | 9/2018 | Chen | H04L 63/1416 |
| 2018/0295153 A1* | 10/2018 | Eisen | H04L 63/08 |
| 2018/0375892 A1* | 12/2018 | Ganor | G06Q 10/06315 |
| 2019/0034657 A1* | 1/2019 | Ford | H04L 63/1433 |
| 2019/0052664 A1* | 2/2019 | Kibler | H04L 63/20 |
| 2019/0173819 A1 | 6/2019 | Wescoe et al. | |
| 2019/0215335 A1 | 7/2019 | Benishti | |
| 2019/0245885 A1 | 8/2019 | Starink et al. | |
| 2019/0266526 A1* | 8/2019 | Knuff | G06Q 10/0635 |
| 2019/0295186 A1* | 9/2019 | Zhou | G06F 16/9535 |
| 2019/0340385 A1* | 11/2019 | Alsina | G06F 16/27 |
| 2020/0089848 A1* | 3/2020 | Abdelaziz | G06N 20/00 |
| 2020/0106801 A1* | 4/2020 | Evans | H04L 63/1433 |
| 2020/0112582 A1* | 4/2020 | Chakra | G06F 21/46 |
| 2020/0125766 A1* | 4/2020 | Yang | H04L 9/0637 |
| 2020/0137096 A1* | 4/2020 | Endler | H04L 63/0846 |
| 2020/0137110 A1* | 4/2020 | Tyler | H04L 63/1483 |
| 2020/0252422 A1* | 8/2020 | Davis | H04L 63/102 |
| 2020/0267183 A1* | 8/2020 | Vishwanath | H04L 63/1483 |
| 2020/0322335 A1* | 10/2020 | Vbh | H04L 63/0884 |
| 2020/0389482 A1* | 12/2020 | Engle | H04L 63/1433 |
| 2020/0412762 A1* | 12/2020 | Mohamed | G06F 9/451 |
| 2021/0051206 A1* | 2/2021 | Kursun | G06Q 20/405 |
| 2021/0084063 A1* | 3/2021 | Triantafillos | H04L 67/22 |
| 2021/0185075 A1 | 6/2021 | Adams | |
| 2021/0194924 A1 | 6/2021 | Heinemeyer et al. | |
| 2021/0209245 A1* | 7/2021 | Lee | G06F 21/6245 |
| 2021/0209600 A1* | 7/2021 | Fontana | G06Q 40/02 |
| 2021/0400049 A1* | 12/2021 | Denning | H04L 63/102 |
| 2021/0407308 A1 | 12/2021 | Brubaker et al. | |
| 2022/0005373 A1 | 1/2022 | Nelson et al. | |
| 2022/0006830 A1 | 1/2022 | Wescoe | |
| 2022/0021654 A1* | 1/2022 | Trentini | H04L 63/0272 |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0129990 A1* | 4/2022 | Roudaut | H04L 63/1433 |
| 2022/0130274 A1 | 4/2022 | Krishna Raju et al. | |

\* cited by examiner

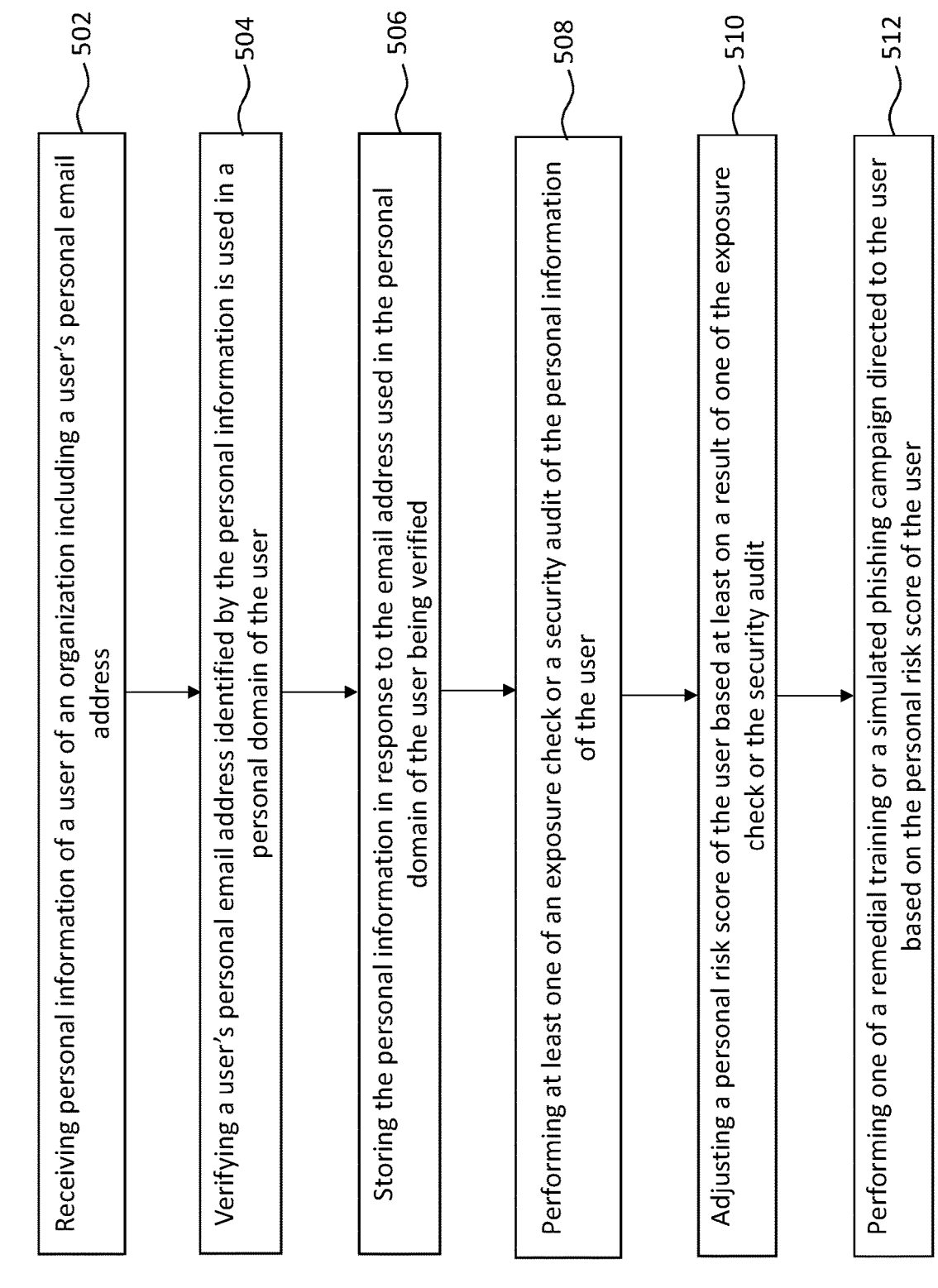

SYSTEMS AND METHODS FOR IMPROVING ASSESSMENT OF SECURITY RISK BASED ON PERSONAL INTERNET ACCOUNT DATA

RELATED APPLICATION

This patent application claims the benefit of and priority to U.S. Provisional Patent Application No. 63/123,812 titled "SYSTEMS AND METHODS FOR IMPROVING ASSESSMENT OF SECURITY RISK BASED ON PERSONAL INTERNET ACCOUNT DATA," and filed Dec. 10, 2020, which also claims the benefit of and priority to U.S. Provisional Patent Application No. 63/142,071 titled "SYSTEMS AND METHODS FOR IMPROVING ASSESSMENT OF SECURITY RISK BASED ON PERSONAL INTERNET ACCOUNT DATA," and filed Jan. 27, 2021, the contents of all of which are hereby incorporated herein by reference in its entirety for all purposes

TECHNICAL FIELD

The present disclosure relates to systems and methods for improving assessment of security risk that users pose to an organization based on their personal internet account data.

BACKGROUND

Cybersecurity incidents such as phishing attacks may cost organizations in terms of the loss of confidential and/or important information and expense in mitigating losses due to breaches of confidential information. Such incidents can also cause customers to lose trust in the organizations. The incidents of cybersecurity attacks and the costs of mitigating the damage caused are increasing every year. Organizations invest in cybersecurity tools such as antivirus, anti-ransomware, anti-phishing, and other platforms. Such cybersecurity tools may detect and intercept known cybersecurity attacks. However, social engineering attacks or new threats may not be readily detectable by such tools, and the organizations may have to rely on their employees to recognize such threats. A social engineering attack is an attack that exploits human behavior to gain access to an organization's systems through attack vectors such as phishing emails. A phishing email may include content to be presented to a user, where the content is chosen to convince the user that the phishing email is genuine and that the user should interact with it. The more contextually relevant and personal the content is to the user, the higher is the likelihood that the user will interact with it.

Among the cybersecurity attacks, organizations have recognized phishing attacks and social engineering attacks as one of the most prominent threats that can cause serious data breaches, including confidential information such as intellectual property, financial information, organizational information, and other important information. Attackers who launch phishing attacks and social engineering attacks may attempt to evade an organization's security apparatuses and tools and target its employees. To prevent or to reduce the success rate of phishing attacks on employees, the organizations may conduct security awareness training programs for their employees, along with other security measures. Through security awareness training programs, the organizations actively educate their employees on how to spot and report a suspected phishing attack. These organizations may operate the security awareness training programs through their in-house cybersecurity teams or may utilize third-party entities who are experts in cybersecurity matters to conduct such training. The employees may follow best practices of cybersecurity hygiene and comply with security regulations while working in offices. At times, for example, while working remotely, the employees may not follow the best practices of cybersecurity hygiene and may not comply with security regulations, partly due to the fact that the employees do not feel watched.

An organization's security may also be affected by its employees' behavior outside the organization. For example, the employees' behavior when in their personal domain may directly or indirectly jeopardize the organization's security. Examples of such behaviors include using the organization's email address for personal purposes and password reuse between work and personal accounts.

SUMMARY

The present disclosure generally relates to systems and methods for improving assessment of security risk that users pose to an organization based on their personal internet account data or other personal information.

Systems and methods are provided for using personal information of a user for determining a personal risk score of the user of an organization. In an example embodiment, a method of using personal information of a user for determining a personal risk score of the user of an organization is described, which includes receiving, by a security awareness system configured on one or more servers, personal information of a user or registration of personal information of a user of an organization, performing, by the security awareness system, at least one of an exposure check or a security audit of the personal information of the user, and adjusting, by the security awareness system, a personal risk score of the user based at least on a result of one of the exposure check or the security audit.

In some implementations, the method includes, verifying, by the security awareness system, an email address identified by the personal information as used in a personal domain of the user.

In some implementations, the method includes, storing, by the security awareness system, the email address used in the personal domain of the user in association with a profile of the user for the security awareness system.

In some implementations, the method includes registering the personal information with the security awareness system in response to the email address used in the personal domain of the user being verified.

In some implementations, the method includes storing, by the security awareness system, the personal information in an obfuscated form.

In some implementations, the method includes performing an exposure check by searching using at least one of an email address or a username in the personal information for breached user information in one or more breach databases.

In some implementations, the method includes performing a security audit by assessing a strength of one or more registered personal passwords from the personal information and compliance to password requirements of the organization.

In some implementations, the method includes adjusting the personal risk score of the user based on at least the user's registration of the personal information with the security awareness system or based on the security awareness system receiving the user's personal information.

In some implementations, the method includes determining by the security awareness system a risk score based at least on the personal risk score of the user.

In some implementations, the method includes performing by the security awareness system, based on at least the personal risk score of the user, one of a remedial training or a simulated phishing campaign directed to the user.

In another example implementation, the security awareness system is configured to determine when a user has registered for a website in a personal domain using his or her organization login credentials based on monitoring a mailbox of the user. In an implementation, the security awareness system is configured to determine whether the user has registered for the website using current organization login credentials or previous organization login credentials. The security awareness system provides training to the user about a safe use of the organization login credentials.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 5 depicts a flowchart for performing a remedial training or a simulated phishing campaign directed to the user based on the personal risk score of the user, according to some embodiments.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for improving assessment of security risk that users pose to an organization based on their personal internet account data.

A. Computing and Network Environment

Figure 1A:
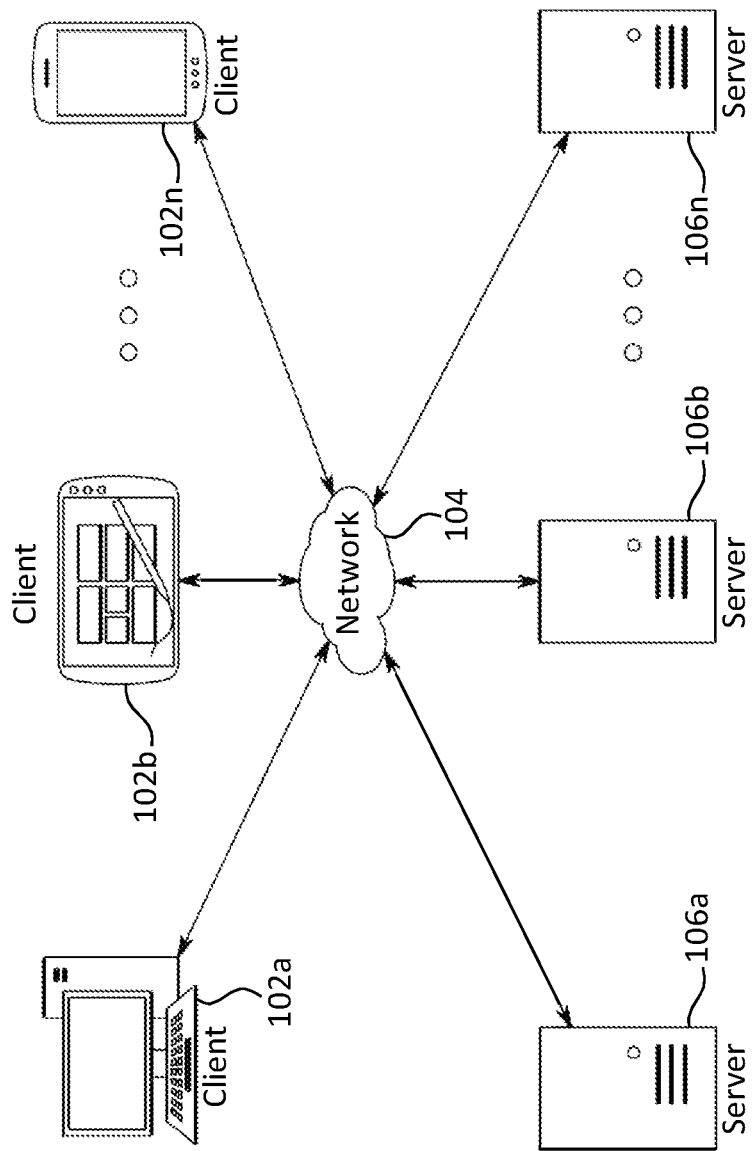
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and Ipv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm, a server cluster, or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or security system. In one embodiment, a plurality of servers 106 may be in the path between any two communicating servers 106.

Figure 1B:
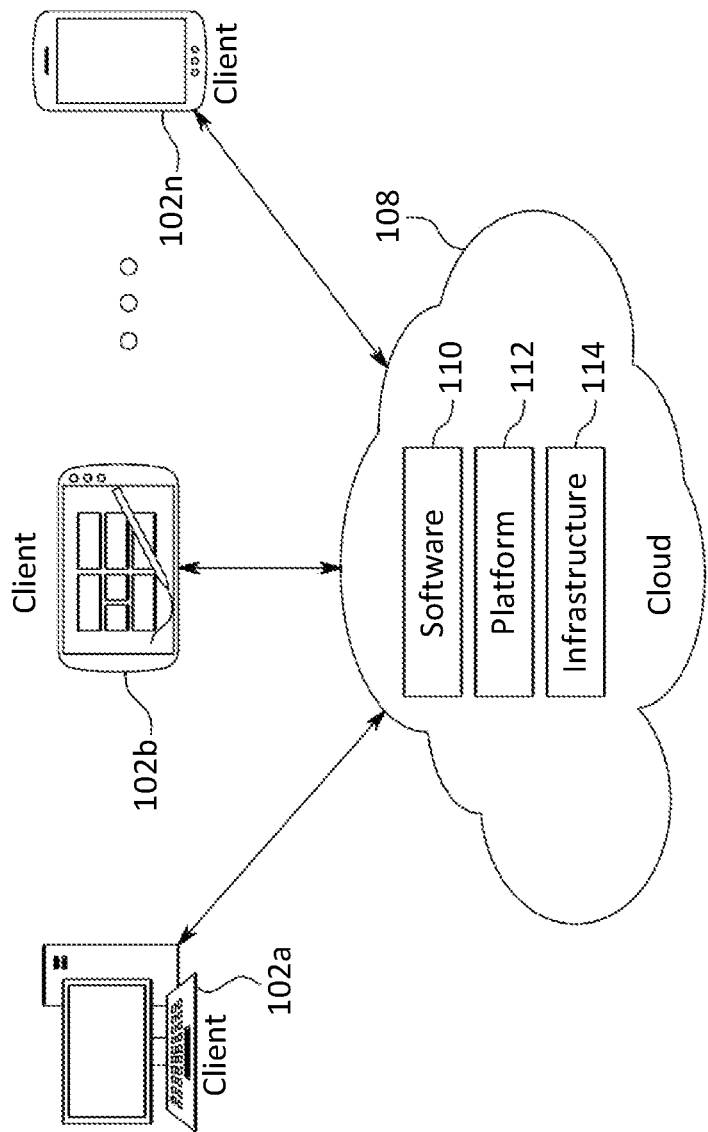
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization, or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
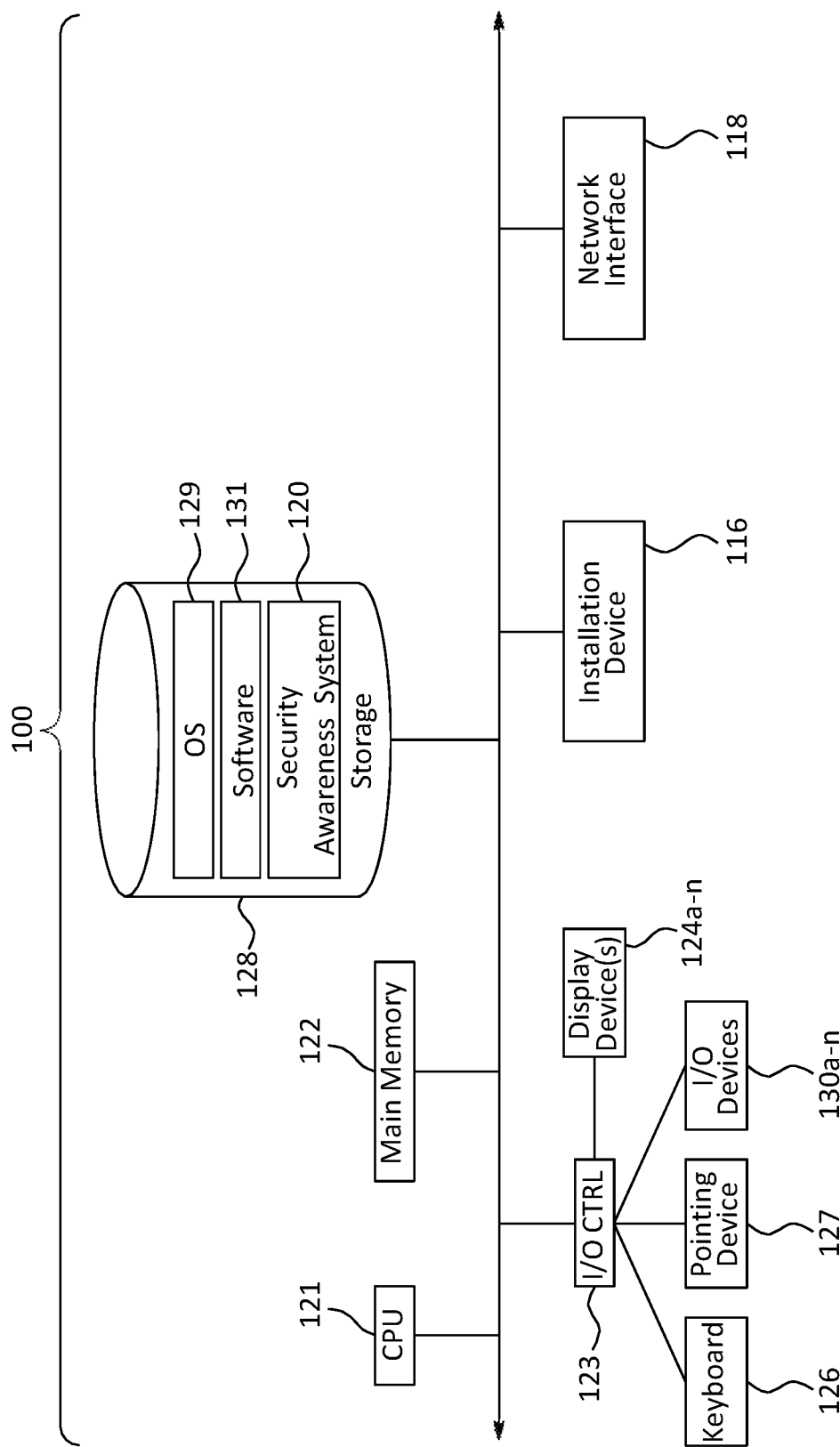
FIGS. 1C and 1D are block diagrams depicting embodiments of computing devices useful in connection with the methods and systems described herein, according to some embodiments.
Figure 1D:
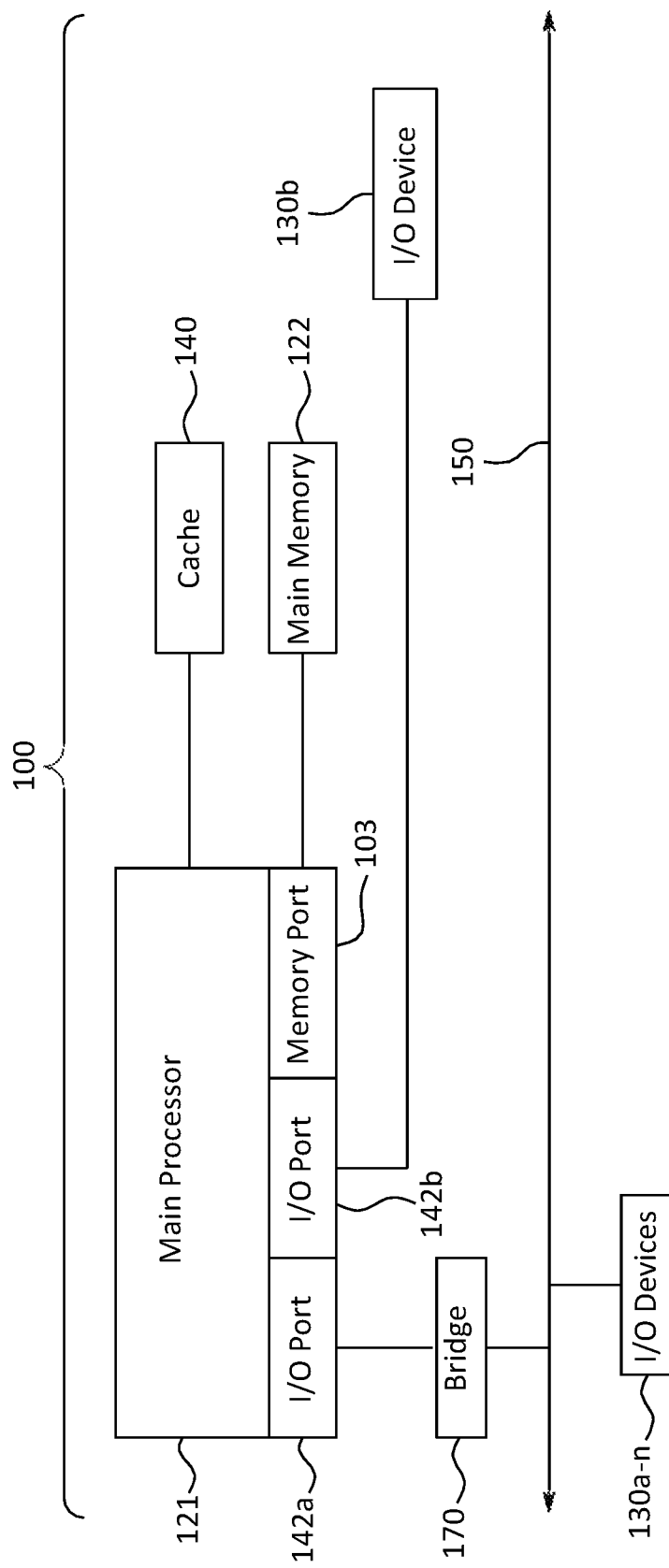

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect, or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage devices 128 may be internal and connect to computing device 100 via bus 150. Some storage devices 128 may be external and connect to computing device 100 via a I/O device 130 that provides an external bus. Some storage devices 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, N.Y.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Improving Assessment of Security Risk Based on Personal Internet Account Data The following describes systems and methods for improving assessment of security risks that users pose to an organization based on their personal internet account data.

An organization does not usually have access to information related to a users' personal domain such as a users' personal email address. Also, the organization may not have any measure to detect the security awareness behavior of users in their personal domain. As a result, the full security risk that users pose to the organization may not be known to it. Furthermore, even if the organization has access to personal information of the users, it would most likely be available within a particular department, for example, a Human Resources (HR) department, and not available to any other department within the organization. In an example, the personal information of the users may not be available to a system administrator or an Information Technology (IT) department of the organization. The system administrator may be a professional (or a team of professionals) managing organizational cybersecurity aspects. The system administrator may oversee and manage IT systems of the organization.

Also, a significant number of organization email breaches occur when users use their organization email address for registrations on websites in their personal domain. In an example, users may use their organization email address to register to entertainment and media websites, for example, for gaming, travel, booking restaurants, and other personal purposes. Such usage exposes the users' organization email address to risk, and it may be subjected to attacks or may become compromised. Accordingly, when a user registers for a website in a personal domain using organization login credentials (e.g., one or more of an email address, a username, an email, or password) the user may unintentionally expose the organization login credentials to a risk of hijacking that may provide to an attacker access to organizational data.

Figure 2:
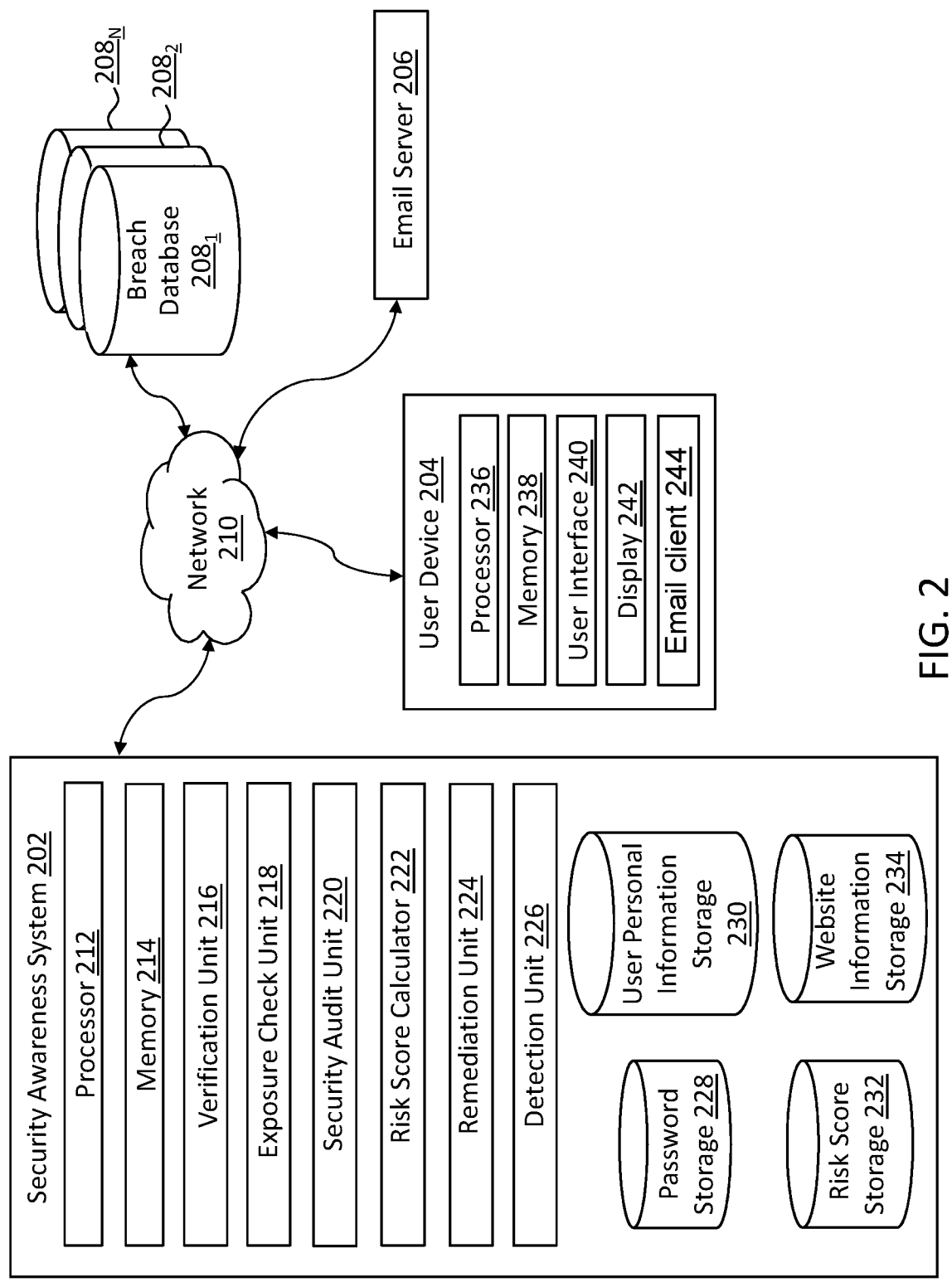
FIG. 2 depicts an implementation of some of an architecture of a system for determining a personal risk score of a user of an organization based on personal information of the user, according to some embodiments.

FIG. 2 depicts an implementation of some of an architecture of an implementation of system 200 for determining a personal risk score of a user of an organization based on personal information of the user, according to some embodiments.

System 200 may include security awareness system 202, user device 204, email server 206, one or more breach databases $208_{1-N}$, and network 210 enabling communication between the system components for information exchange. Network 210 may be an example or instance of network 104, details of which are provided with reference to FIG. 1A and its accompanying description.

According to some embodiments, security awareness system 202 may be implemented in a variety of computing systems, such as a mainframe computer, a server, a network server, a laptop computer, a desktop computer, a notebook, a workstation, and any other computing system. In an implementation, security awareness system 202 may be implemented in a server, such as server 106 shown in FIG. 1A. In some implementations, security awareness system 202 may be implemented by a device, such as computing device 100 shown in FIGS. 1C and 1D. In some embodiments, security awareness system 202 may be implemented across a server cluster, thereby, tasks performed by security awareness system 202 may be performed by the plurality of servers. These tasks may be allocated among the server cluster by an application, a service, a daemon, a routine, or other executable logic for task allocation.

In one or more embodiments, security awareness system 202 may facilitate cybersecurity awareness training, for example, via simulated phishing campaigns, computer-based trainings, remedial trainings, and risk score generation and tracking. A simulated phishing campaign is a technique of testing a user to see whether the user is likely to recognize a true malicious phishing attack and act appropriately upon receiving the malicious phishing attack. In some embodiments, the user may be an employee of the organization, a customer, a vendor, or anyone associated with the organization. In some embodiments, the user may be an end-customer/consumer or a patron using the goods and/or services of the organization. In an implementation, security awareness system 202 may execute the simulated phishing campaign by sending out one or more simulated phishing messages periodically or occasionally to the users and observe responses of the users to such simulated phishing messages. A simulated phishing message may mimic a real phishing message and appear genuine to entice a user to respond/interact with the simulated phishing message. The simulated phishing message may include links, attachments, macros, or any other simulated phishing threat that resembles a real phishing threat. In response to a user interaction with the simulated phishing message, for example, if the user clicks on a link (i.e., a simulated phishing link), the user may be provided with security awareness training. If and how the user interacts with the simulated phishing message may be logged and may impact a risk score of the user, a risk score of a team of which the user is part of, a risk score of the user's organization, and/or a risk score of an industry to which the user's organization belongs.

In some implementations, security awareness system 202 may be owned or managed or otherwise associated with an organization or any entity authorized thereof. In an implementation, security awareness system 202 may be managed by a system administrator. The system administrator may oversee and manage security awareness system 202 to ensure cybersecurity goals of the organization are met. For example, the system administrator may oversee Information Technology (IT) systems of the organization for managing simulated phishing campaigns and any other element within security awareness system 202. In an example, security awareness system 202 may be a Computer Based Security Awareness Training (CBSAT) system that performs security services such as performing simulated phishing campaigns on a user or a set of users of an organization as a part of security awareness training.

Referring again to FIG. 2, in some embodiments, user device 204 may be any device used by the user. User device 204 as disclosed, may be any computing device, such as a desktop computer, a laptop, a tablet computer, a mobile device, a Personal Digital Assistant (PDA) or any other computing device. In an implementation, user device 204 may be a device, such as client device 102 shown in FIG. 1A and FIG. 1B. User device 204 may be implemented by a device, such as computing device 100 shown in FIG. 1C and FIG. 1D.

Further, email server 206 may be any server capable of handling and delivering emails over network 210 using one or more standard email protocols, such as Post Office Protocol 3 (POP3), Internet Message Access Protocol (IMAP), Simple Message Transfer Protocol (SMTP), and Multipurpose Internet Mail Extension (MIME) Protocol. Email server 206 may be a standalone server or a part of an organization server. Email server 206 may be implemented using, for example, Microsoft® Exchange Server, or HCL Domino®. In an implementation, email server 206 may be server 106 shown in FIG. 1A. Email server 206 may be implemented by a device, such as computing device 100 shown in FIGS. 1C and 1D. In some embodiments, email server 206 may be implemented as a part of a server cluster. In some embodiments, email server 206 may be implemented across a plurality of servers, thereby, tasks performed by email server 206 may be performed by the plurality of servers. These tasks may be allocated among the server cluster by an application, a service, a daemon, a routine, or other executable logic for task allocation.

According to some embodiments, one or more breach databases $208_{1-N}$ may be dynamic databases that include public databases and/or private databases. One or more breach databases $208_{1-N}$ may include information related to user login credentials of websites which have been breached. Examples of user login credentials may include a username, an email address and/or a password. A username is a unique combination of characters, such as letters of the alphabet and/or numbers and/or non-alphanumeric symbols, that identify a specific user. The user may gain access to a website using the user login credentials. In an example implementation, security awareness system 202 may determine whether user login credentials including a username and/or an email address is/are associated with a data breach if the username and/or the email address is found in one or more breach databases $208_{1-N}$. In some embodiments, information related to the user login credentials of the users stored in one or more breach databases $208_{1-N}$ may be periodically or dynamically updated as required.

According to some embodiments, security awareness system 202 may include processor 212 and memory 214. For example, processor 212 and memory 214 of security awareness system 202 may be CPU 121 and main memory 122, respectively, as shown in FIGS. 1C and 1D. According to an embodiment, security awareness system 202 may include verification unit 216, exposure check unit 218, security audit unit 220, risk score calculator 222, remediation unit 224, and detection unit 226. In an implementation, verification unit 216, exposure check unit 218, security audit unit 220, risk score calculator 222, remediation unit 224, and detection unit 226 may be coupled to processor 212 and memory 214. In some embodiments, verification unit 216, exposure check unit 218, security audit unit 220, risk score calculator 222, remediation unit 224, and detection unit 226 amongst other units, may include routines, programs, objects, components, data structures, etc., which may perform particular tasks or implement particular abstract data types. Verification unit 216, exposure check unit 218, security audit unit 220, risk score calculator 222, remediation unit 224, and detection unit 226 may also be implemented as, signal processor(s), state machine(s), logic circuitries, and/or any other device or component that manipulate signals based on operational instructions.

In some embodiments, verification unit 216, exposure check unit 218, security audit unit 220, risk score calculator 222, remediation unit 224, and detection unit 226 may be implemented in hardware, instructions executed by a processing unit, or by a combination thereof. The processing unit may comprise a computer, a processor, a state machine, a logic array, or any other suitable devices capable of processing instructions. The processing unit may be a general-purpose processor that executes instructions to cause the general-purpose processor to perform the required tasks or, the processing unit may be dedicated to performing the required functions. In some embodiments, verification unit 216, exposure check unit 218, security audit unit 220, risk score calculator 222, remediation unit 224, and detection unit 226 may be machine-readable instructions which, when executed by a processor/processing unit, perform any of the desired functionalities. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, the machine-readable instructions may be stored in memory 214.

In some embodiments, security awareness system 202 may include password storage 228, user personal information storage 230, risk score storage 232, and website information storage 234. In an implementation, password storage 228 may include information about organization passwords of the users. User personal information storage 230 may store information related to personal accounts of the users. In an example, information related to personal accounts of the users may include personal email addresses, usernames, passwords, and/or other information from the users' personal domain. According to an implementation, the users may voluntarily provide the information related to their personal accounts. In an example, user personal information storage 230 may also store information about past or previous organizations of the user, such as previous organization email addresses. Further, risk score storage 232 may include security awareness profiles of the users and risk scores of the users (in some examples, the security awareness profile of the user may include of a risk score of the user). In an example, a security awareness profile of a user may include information about the security awareness of the user and other information which is relevant for assessing the security awareness of the user. A risk score of a user may include a representation of the susceptibility of the user to a malicious attack. Also, the risk score for a user may quantify a cybersecurity risk that the user poses to an organization. The risk score may also quantify the level of risk for a group of users, the organization, an industry to which the organization belongs, a geography, and any other categorization. In an example, the risk score of the user may be modified based on the user's responses to simulated phishing messages, assessed user behavior, breached user information, completion of training by the user, a current position of the user in the organization, a size of a network of the user, an amount of time the user has held the current position in the organization, and/or any other attribute that can be associated with the user. In an implementation, a higher risk score of the user indicates that a higher security risk is associated with the user and a lower risk score indicates a lower security risk and better security awareness.

According to an implementation, website information storage 234 may store information related to personal domain websites. In an example, website information storage 234 may store information about login pages for known or popular personal domain websites, email addresses associated with messages sent by those websites, or examples of registration email validation messages and promotional messages used by personal domain websites. In an example, a registration email validation message is a message that is sent by a website (for example, a personal domain website) to an email address that a user input when registering with the website. The registration email validation message may include a link for the user to click to validate that he or she is the owner of the email address and may include keywords such as "verify your email address," "confirm your email," and "activate your account." Further, in an example, a promotional message may be an email message such as a weekly newsletter, a sale promotion email, and other promotional messages that a business distributes to promote their products, services, offers, campaigns, etc. In an example, the promotional messages from various personal domain websites may have specific characteristics in common. In an example, the promotional messages may include an unsubscribe link (for example, "Click here to unsubscribe from these emails"), discount details (for example, "up to 40% off") and other such characteristics. Further, promotional messages may include keywords such as "discount," "unsubscribe," "sale," "offer," and "hurry."

Information about organization passwords of the users stored in password storage 228, personal information related to the users stored in user personal information storage 230, security awareness profiles of the users and risk scores of the users stored in risk score storage 232, and information about personal websites stored in website information storage 234 may be periodically or dynamically updated as required.

Referring again to FIG. 2, in some embodiments, user device 204 may be any device used by a user. The user may be an employee of an organization or any entity. According to some embodiments, user device 204 may include processor 236 and memory 238. In an example, processor 236 and memory 238 of user device 204 may be CPU 121 and main memory 122, respectively, as shown in FIGS. 1C and 1D. User device 204 may also include user interface 240 such as a keyboard, a mouse, a touch screen, a haptic sensor, voice-based input unit, or any other appropriate user interface. It shall be appreciated that such components of user device 204 may correspond to similar components of computing device 100 in FIGS. 1C and 1D, such as keyboard 126, pointing device 127, I/O devices 130a-n and display devices 124a-n. User device 204 may also include display 242, such as a screen, a monitor connected to the device in any manner, or any other appropriate display. In an implementation, user device 204 may display received content (for example, emails) for the user using display 242 and is able to accept user interaction via user interface 240 responsive to the displayed content.

In some embodiments, user device 204 may include email client 244. In one example implementation, email client 244 may be an application installed on user device 204. In another example implementation, email client 244 may be an application that can be accessed over network 210 through a browser without requiring to be installed on user device 204. In an implementation, email client 244 may be any application capable of composing, sending, receiving, and reading email messages. For example, email client 244 may be an instance of an application, such as Microsoft Outlook™ application, HCL Notes application, IBM® Lotus Notes® application, Apple® Mail application, Gmail® application, or any other known or custom email application. In an example, a user of user device 204 may be mandated to download and install email client 244 by the organization. In another example, email client 244 may be provided by the organization as default. In some examples, a user of user device 204 may select, purchase and/or download email client 244, through for example, an application distribution platform. The term "application" as used herein may refer to one or more applications, services, routines, or other executable logic or instructions.

According to one or more embodiments, a user of the organization may be aware that his or her actions outside the organization may affect the security of the organization. In some instances, the user may be willing to improve his or her security awareness behavior. In an implementation, the user, or another person, for example, the users' manager in the organization, may place a request to security awareness system 202 for registration of the user's personal information. In examples, a user, a user's manager, a system administrator or a security awareness system may initiate a request from security awareness system 202 to the user's device 204 causing the user's device 204 to display a request to the user, wherein the request to the user requests that the user register personal information with the security awareness system or the request to the user requests that the user sends personal information to the security awareness system. In one example, the user may initiate the request by opting in for personal information registration. In an implementation, security awareness system 202 may receive a request for registration of the personal information of the user, for example from a user's manager or a system administrator or other company official. In some implementations, security awareness system 202 may initiate the request for registration of the personal information of the user on behalf of the user. In some implementations, security awareness system 202 may prompt or provide an option to the user to register their personal information. According to an example, a user may provide personal information to security awareness system 202 voluntarily or in response to a prompt. Security awareness system 202 may receive the personal information of the user, for example, one or more of a personal email address, a username, and a personal password or a password associated with a personal domain. In examples, "registration" of personal information of the user at the security awareness system 202 is considered performed merely by the security awareness system 202 receiving personal information of the user.

In order to verify that the personal information provided by the user or for the user belongs to the user, security awareness system 202 may initiate verification of the personal information through verification unit 216. In a scenario where the user's personal information includes an email address, verification unit 216 may verify that the personal email address is within the personal domain of the user. According to an implementation, verification unit 216 may send a confirmation email to the personal email address provided by the user or for the user to verify whether the personal email address is controlled by the user. For example, a confirmation email may include a one-time code for the user to input into security awareness system 202 confirming access to the personal email address. In examples, the one-time code may be valid for only one login session or transaction or may be valid only for a short period of time. In an example, the one-time code may be valid for a period of time, such as 2 minutes. In some examples, the confirmation email may include a time-sensitive link that has to be followed or clicked within a specified time period (for example, 15 minutes) to complete the verification process. In some examples, the user may input the one-time code into security awareness system 202 or follow the provided link within the specified time period to validate the ownership of, or access to the personal email address. The input of the correct one-time code or following of the supplied link within the specified time period enables verification unit 216 to verify that the personal email address provided for or by the user and/or the personal information provided for or by the user is owned or controlled by the user. Accordingly, verification unit 216 prevents a user from, for example, registering with another user's email address. Other methods to confirm or verify that personal information registered with or sent to security awareness system 202 belongs to the user that are not discussed here are contemplated herein.

According to some embodiments, verification unit 216 may be configured to register and store personal information of the user in response to verification that the personal email address provided for or by the user is within the personal domain of the user. In another embodiment, verification unit 216 may register and store personal information provided for or by the user without verifying that the personal information belongs to the user. Verification unit 216 may be configured to store personal information of the user in user personal information storage 230. In an implementation, for security and privacy reasons and/or to comply with respective privacy laws of corresponding countries, verification unit 216 may store personal information of the user in an encrypted, hashed, or obfuscated form. In some examples, verification unit 216 may store personal information of the user in a plain text or non-encrypted form. In some implementations, verification unit 216 may establish a link between a security awareness profile of the user and personal information of the user.

After personal information of the user is registered and/or received and/or stored, verification unit 216 may be configured to notify the system administrator that the user has provided or sent personal information to security awareness system 202 or has registered personal information with security awareness system 202. In some implementations, verification unit 216 may provide levels of visibility of personal information of a user to the system administrator. In an example, personal information of one or more users may be fully visible to the system administrator. In some examples, personal information of the one or more users may be partially obscured. For example, an email address "user08@gmail.com" may be displayed to the system administrator as u***@***.com or another combination of obfuscated and actual characters. In some examples, the information may be unavailable to the system administrator. In some scenarios, the system administrator may be given an indication confirming that the user has registered his or her personal information with security awareness system 202. Further, in some examples, the personal information may be unavailable to the system administrator, and the system administrator is not notified when the personal information is provided by the user. In some embodiments, access to passwords entered into security awareness system 202 may be restricted to non-humans, such as Artificial Intelligence (AI), operating logic, and other processing systems.

According to some embodiments, security awareness system 202 may perform an exposure check and/or a security audit on the personal information of the user. In an implementation, exposure check unit 218 is configured to perform the exposure check of the personal information of the user by searching for user's personal information or credentials in one or more breach databases $208_{1-N}$. For example, exposure check unit 218 may check if one or more usernames and/or email addresses registered by the user is found in the one or more breach databases $208_{1-N}$ thereby indicating that the one or more usernames and/or email addresses have been exposed in a security breach. In an implementation, exposure check unit 218 may use at least one of an email address or a username in the personal information to search for breached user information in one or more breach databases $208_{1-N}$. In an example, exposure check unit 218 may separate the email address account name (user) from its domain name (@company.com) and perform an exposure check on the account name. For example, if the email address provided by the user is "user08@gmail.com," then exposure check unit 218 may separate "user08" from "user08@gmail.com" and perform an exposure check using the account name "user08".

In implementations where the user has provided one or more passwords during registration, exposure check unit 218 may check whether those passwords are associated with any known data breach. In an example, exposure check unit 218 may determine that a password is associated with a known data breach if the password is detected in one or more breach databases $208_{1-N}$. In some examples, exposure check unit 218 may query one or more breach database $208_{1-N}$ to determine if the one or more passwords provided by the user have been compromised in a data breach. In some examples, exposure check unit 218 may provide the passwords in a query to one or more breach database $208_{1-N}$.

In some embodiments, security audit unit 220 may be configured to perform a security audit of the personal information of the user. In an implementation, security audit unit 220 may perform the security audit by assessing a strength of the one or more stored personal passwords from the personal information and evaluating whether the passwords used for personal information comply with policies that the organization has for password strength. In some examples, security audit unit 220 may assess the personal passwords to determine if there is password reuse or password sharing. In an example, password reuse refers to a same user using the same password to log in to more than one account and password sharing refers to a scenario where a password of a user of an organization is identified as identical to or similar to a password of another user of the organization. In an embodiment, security audit unit 220 may assess the strength of the one or more personal passwords based on some standards, such as National Institute of Standards and Technology (NIST) standards provided below.

a) A minimum of eight characters and a maximum length of at least 64 characters.

b) The ability to use all special characters but no special requirement to use them.

c) Restrict sequential and repetitive characters (e.g., 12365 or aaaaaa).

d) Restrict context specific passwords (e.g., the name of the site, etc.).

e) Restrict commonly used passwords (e.g., p@ssw0rd, etc.) and dictionary words.

f) Restrict passwords that match those obtained from previous breaches.

In an implementation, security audit unit 220 may compare the one or more registered personal passwords and identify reused passwords or derived passwords. In an example, "R@31F", "password1", "Welcome!", "password2" and "PaSsWoRd" may be poor personal passwords provided by the user. A reused password may be a password that has been used previously or a password having similarity to a certain degree to a password that has been used previously. In an implementation, security audit unit 220 may identify "password1", "password2", and "PaSsWoRd" as reused when compared to the password "password". Security audit unit 220 may use one or more tools to create permutations of one or more passwords to use as search terms. An example of one such tool is the "Bad Password Generator" tool, available via the website of bad.pw and created by Harold Zang, referred to as SpZ (at spz.io).

In some embodiments, security audit unit 220 may perform a search for the registered personal passwords within password storage 228 to identify incidents of password sharing. In an example, security audit unit 220 may compare the personal passwords with other passwords within password storage 228. In an implementation, security audit unit 220 may search within the organization's Active Directory, or other corporate databases, for a match to passwords that the user is using within the organization. In an implementation, one or more breach databases $208_{1-N}$ and password storage 228 may be continually or periodically monitored for similarity or match to the user's personal information. In an embodiment, the results of the exposure check and/or the results of the security audit may be provided to the system administrator.

According to an embodiment, security audit unit 220 may provide the user with a report on threats, breaches, and poor password hygiene associated with a personal domain as an incentive for registering his or her personal information with the organization, thus enabling the user to take appropriate actions to protect their personal information. In an example, security audit unit 220 may generate the report based on information determined by exposure check unit 218 and/or security audit unit 220 and in a further example, security audit unit 220 may generate the report based on searching breach data sites, such as "https://haveibeenpwned.com/" and "https://spycloud.com/" and dark web sources. In an implementation, security audit unit 220 may apply some or all of the security audit process to create a report for the user. In an example, the report may enable the user to gain a greater understanding of the risks that activities in the personal domain create for his or her personal information. Further, the user may be motivated to share further personal information with the organization so that the user can be informed about the risks associated with activities in the personal domain.

In an implementation, risk score calculator 222 may be configured to calculate one or more risk scores for the user. According to an embodiment, a non-exhaustive list of examples of individual risk scores include a personal risk score and an organization risk score. Other examples of the individual risk scores that are not discussed here are contemplated herein. In an example, an organization risk score for a user is a component of the risk score which is attributed to data held within the organization as a part of the ongoing employment of the user, and a personal risk score for the user is a component of the risk score which is attributed to the user's personal information and habits/behaviors within the personal domain. In an example, the personal risk score may also reflect a willingness of the user to provide the personal information to the organization that the user is not obliged to provide. In an example, more or fewer individual risk scores may be enabled by security awareness system 202. In examples where more than one risk score is contemplated, risk score calculator 222 may calculate each risk score individually or in another example, risk score calculator 222 may calculate a single, overall risk score for the user taking into account contributions from each area of risk. In some embodiments, risk score calculator 222 may be configured to calculate or adjust a personal risk score of the user according to an analysis of the user's personal information. In an example, when the user registers his or her personal information with security awareness system 202, risk score calculator 222 may set the personal risk score of the user at a level that indicates an action of opting-in. According to an embodiment, the amount of personal information that the user provides may affect the personal risk score of the user. For example, if the user provides two email addresses, then the personal risk score for the user may be set lower than if the user had provided a single email address. Further, in an example, if the user provides password information associated with the email address then the personal risk score may be set lower than if the user had provided only the email address. Many such combinations are contemplated herein to set or modify the personal risk score.

In an implementation, there may be multiple levels of access to the user's personal risk score. In an example, both the personal risk score of the user and the organization risk score of the user's organization may be visible to the system administrator. In some examples, the organization risk score of the user's organization may be visible to the system administrator as a risk score separate from the personal risk score of the user. In some examples, the personal risk score of the user may not be visible to the system administrator. In some embodiments, security awareness system 202 may provide a notification to the system administrator that the personal risk score of the user is managed by security awareness system 202 but is not configured to be visible to the system administrator.

In an implementation, risk score calculator 222 may calculate a personal risk score for the user based on various factors such as whether the user has low or negligible personal information exposure, whether the user has moderate personal information exposure, and whether the user has high personal information exposure. In an example, these factors may be placed on an importance/weight scale, for example, from 1 to 10. In an implementation, risk score calculator 222 may assign an example weight range "0-3" to the factor "the user has negligible personal information exposure", an example weight range "4-7" to the factor "the user has moderate personal information exposure", and an example weight range "8-10" to the factor "the user has high personal information exposure".

According to an embodiment, the calculated value of the personal risk score (for example, 0 to 10) may be based on a threshold of a number of instances that the user's personal information was found in a breach, the strength of the passwords provided by the user, whether the breach was found in one or more breach databases 208$_{1-N}$, whether the database containing the breach was a database solely enabled by security awareness system 202 or a public database, or whether the information was found through the exposure check or the security audit. In an implementation, risk score calculator 222 may adjust the personal risk score of the user based at least on a result of the exposure check and/or the security audit.

Further, the personal risk score for the user may be updated based on a weighted risk score for each instance of breach associate with the user's personal information. In some examples, each instance of a breached username of user may only be counted once towards the user's personal risk score, each instance of a breached password of the user may be counted 1.5 times towards the user's personal risk score, and each instance of a username of the user with a password of the user from the same breach may be counted 2 times towards the user's personal risk score. In an example, the personal risk score is incorporated into a risk score of the user that is calculated to determine the propensity that the user may respond to a malicious attack.

Risk score calculator 222 may also calculate an organization risk score for the organization of user. A description of such a system may be found in U.S. Pat. No. 10,673,876. In an example, risk score calculator 222 may calculate an organization risk score for the organization of user based on whether the user has interacted with malicious attacks in the past, whether the user received a high number of malicious attacks, and/or whether a job title of the user gives him or her expanded access to an organization network, any of which may pose a risk to the organization of the user. Examples of calculation of other types of risk scores that are not discussed here are contemplated herein and may be carried out by risk score calculator 222.

According to an embodiment, risk score calculator 222 may combine a personal risk score of a user with an organization risk score of the user's organization to generate a risk score. In an implementation, risk score calculator 222 may combine a personal risk score of a user with an organization risk score of the user's organization using an algorithm or algorithms. In an example, an example of such an algorithm may be a weighting algorithm which may be adjusted depending on the severity of the breach associated with the user, the kind of breach associated with the user, or any other metric measured by security awareness system 202. In an example, a personal risk score of the user and the organization risk score of the user's organization may be stored in risk score storage 232. In an implementation, security awareness system 202 may send a notification to a system administrator about a personal risk score of the and the organization risk score of the user's organization being combined.

In some embodiments, a personal risk score of a user, organization risk score of the user's organization, or any other risk score contemplated may be used separately by security awareness system 202. In some examples, risk score calculator 222 is further configured to determine an risk score of the user based at least on the personal risk score of the user.

In an example, one or more risk scores in addition to a personal risk score of a user and organization risk score of a user's organization may be contemplated. In this case, these one or more additional risk scores may be combined with each other, with the personal risk score of the user and/or with organization risk score of the user's organization, for example according to an algorithm performed by risk score calculator 222.

According to some embodiments, remediation unit 224 may be configured to perform remedial training directed to a user based on at least a personal risk score of the user. For example, remediation unit 224 may be configured to perform remedial training if a user's personal risk score exceeds a set level or if the user's personal risk score increases. In an example, remediation unit 224 may perform remedial training by tailoring training content to educate the user. In examples, remediation unit 224 may provide training to the user via a landing page hosted by security awareness system 202. In an example, the landing page may be a web page that enables provisioning of training materials to the user. For example, the landing page may provide to the user training related to choosing strong passwords and avoiding password reuse and password sharing.

In some embodiments, remediation unit 224 may prompt a user to change one or more passwords. In an implementation, remediation unit 224 may prompt a user to acknowledge a username, password and/or email address associated with the user that has been included in a breach. In an implementation, remediation unit 224 may require the user to render secure one or more of his or her organizational and/or personal accounts by changing one or more passwords. Further, remediation unit 224 may request the user to confirm that the user has secured one or more accounts. In an implementation, remediation unit 224 may provide a recommendation to the user to improve one or more of their personal passwords. Further, in an implementation, remediation unit 224 may recommend and facilitate remedial training to a user via an interaction with the user. In an example, remediation unit 224 may communicate and/or interact with the user using a pop-up message. A pop-up message may be understood to refer to the appearance of graphical or textual content displayed to a user. In examples, a message prompting a user to change one or more passwords of the user may be presented on a display as part of, or within, a "window" or a user interface element or a dialogue box. Other known examples and implementations of pop-up messages are contemplated herein as part of this disclosure.

In an implementation, remediation unit 224 may send one or more communications to a user to determine whether the user has completed training, changed one or more passwords (for example, one or more personal passwords of the user, which in examples cannot be viewed by security awareness system 202), or whether the user has completed any other form of remediation. In an example, on receiving the one or more communications, in examples the user may update personal information of the user with security awareness system 202. In examples, feedback to the user on one or more of security issues, security recommendations, and security remediations may be provided so as to protect the security and privacy of the user and to ensure that it is not possible to infer information about other users in the organization based on information of the user. In an example, if a personal password of a user of an organization is identified as similar to the personal password of another user of the organization, the personal password or similar personal passwords may be flagged to the users as a compromised password. In examples the users may be required to change the same or similar personal passwords. In an embodiment, indications, recommendations, or requirements made by remediation unit 224 to a user regarding reuse or security of the user's personal information are determined in a manner that ensures that the privacy of users of the security awareness system 202 is maintained.

According to an implementation, risk score calculator 222 may adjust a risk score for a user based on one or more actions that the user takes after remediation. I examples, if a user is prompted to change one or more of his or her organization passwords or personal password, risk score calculator 222 may adjust the risk score of the user based on the user's actions in response to the prompt. In an example, risk score calculator 222 may adjust a risk score of the user according to the timeframe in which the user performed an action in response to a prompt. In an implementation, risk score calculator 222 may determine whether a user changed one or more organizational password based on an interaction of the user with the organization's password system, for example, an Active Directory.

In an example, a user may register for a personal domain website using his or her organization login credentials, such as the user's organization email address and/or the user's password. In an implementation, detection unit 226 may detect whether the user has registered for the personal domain website using his or her organization login credentials as previously described. In an implementation, detection unit 226 may continuously or periodically monitor a mailbox of the user for certain types of email messages, such as registration email validation messages and promotional messages that are typically sent from personal domain websites.

According to an implementation, security awareness system 202 and detection unit 226 may use, and/or build and and/or maintain a database of email addresses, registration email validation messages and/or promotional messages that are known to be used by examples of personal domain websites to communicate with registered users of the personal domain website. In an implementation, such a database may be website information storage 234. In an implementation, detection unit 226 may monitor a mailbox of a user for messages from email addresses within website information storage 234. If any such email in the mailbox of the user is found within website information storage 234, detection unit 226 may determine that the user has registered for a personal domain website using the user's organization email address. In an example, detection unit 226 may maintain a list of email addresses used by personal domain websites, such as "amazon.com" and "twitter.com". For example, an email address associated with the personal domain website "amazon.com" may be "store-news@amazon.com" and an email address associated with the personal domain website "twitter.com" may be "info@twitter.com." In examples, if an email from the email address "info@twitter.com" is found in a mailbox of a user, detection unit 226 may determine that the user has registered for the personal domain website "twitter.com" using the user's organization email address.

According to an implementation, detection unit 226 may use a database of examples of registration email validation messages and promotional messages used by personal domain websites to communicate with registered users and may further build a query or queries with the aim of detecting the same or similar messages within mailbox of user. In an implementation, detection unit 226 may determine key content segments which are typical of examples of registration email validation messages and promotional messages used by personal domain websites to communicate with registered users and may combine key content segments together in one or more queries. Detection unit 226 may assign a search score for one or more emails in a user's mailbox based on one or more queries and determine from the search score the likelihood of an email being either a registration email validation message or a promotional message. In an example, if three key content segments are found in an email, then a search score for the message may be 3. In some examples, if nine key content segments are found in an email, then a search score for the email may be 9. In an implementation, detection unit 226 may generate a search score for each of the one or more emails found in the user's mailbox. In a further example, a threshold score of the search score for an email for the email to be classified as a registration email validation message may be different from a threshold score of the search score for an email for the email to be classified as a promotional messages. For example, a threshold score for the search score of an email for the email to be classified as a registration email validation message may be 4 and the threshold score for the search score of an email for the email to be classified as a promotional message may be 8. Accordingly, if an email found in a mailbox of the user has a search score of 5, detection unit 226 may determine that the email is a registration email validation message. Further, if an email found in a mailbox of the user has a search score of 9, then detection unit 226 may determine that the email is a promotional message.

According to some embodiments, security awareness system 202 and detection unit 226 may use, build and/or maintain a list of login pages for known or popular personal domain websites, such as food delivery service websites (for example, such as Door Dash® and Uber Eats®), travel websites (for example, Hotels.com® and Airbnb™), shopping websites (for example, amazon.com and walmart.com), and other such websites. In an example implementation, detection unit 216 may store the list of login pages for known or popular personal domain websites in website information storage 234. Periodically or in response to an event such as the detection of a suspicious email message in a user's mailbox, detection unit 226 may attempt to login to each of the personal domain websites' login pages using the organization login credentials of the user. If a login attempt with the user's organization login credentials is successful for a personal domain website, detection unit 226 may determine that the user has registered for the personal domain website using his or her organization login credentials.

In some embodiments, detection unit 226, using a list of login pages for personal domain websites stored in website information storage 234, may access a reset password link of one or more accounts of personal domain websites which in examples presents an interface to enter the email address associated with the forgotten password. Detection unit 226 may provide the user's organization email address as the email address for the account and if an email is sent to the user's organization email address with a password reset link, then detection unit 226 may determine that the user has registered for the personal domain website using the user's organization login credentials. In an implementation, for example to avoid bulk traffic to a single website, detection unit 226 may use this approach for randomized or periodic checks of one or more users, rather than checking all the users in the organization at the same time. In examples, detection unit 226 may use a plurality of IP addresses to access a reset password link of one or more accounts of personal domain websites to avoid appearing as a DoS attack.

In an implementation, upon detecting emails or messages such as email validation messages, promotional messages, or other messages received from the personal domain website in a mailbox of a user, security awareness system 202 may delete the detected emails. In examples security awareness system 202 may prompt or require a user to change his or her organization password or personal passwords. In further examples security awareness system 202 may deliver remedial training to the user. In some implementations, if security awareness system 202 determines that a user has employed organization login credentials in registering for a personal domain website, detection unit 226 may interact with email server 206 and trigger email server 206 to disable the user's organization password and require the user to create a new organization login credentials, for example a new organization password, for example, before the user is able to access various servers and services of the organization.

According to an embodiment, security awareness system 202 may implement monitoring processes in a manner that respects the privacy laws of a country in which the organization of the user and/or the user is located. In an example, security awareness system 202 may obfuscate a user's personal information from a system administrator, and the user may have the option to manage the amount of personal information that is to be made visible to the system administrator. In examples, if a user's personal or work email account is deactivated or archived, or the user de-registers some or all of their personal information from security awareness system 202, then security awareness system 202 may remove the user's personal information for example as a best practice and/or to comply with various privacy regulations such as General Data Protection Regulation (GDPR).

In one or more embodiments, a user may choose to de-register his or her personal information from security awareness system 202 at any time. In such a scenario, all personal information and other relevant records pertaining to the user may be removed or deleted from security awareness system 202. In an example, a personal risk score of the user may be removed from risk score storage 232, however the effect that the personal risk score of the user contributed to the risk score of the user may persist despite the user de-registering their personal information. In some examples, some or all of the component of risk score of the user contributed by the personal risk score of the user f is reversed, if the user de-register his or her personal information from security awareness system 202.

Figure 3:
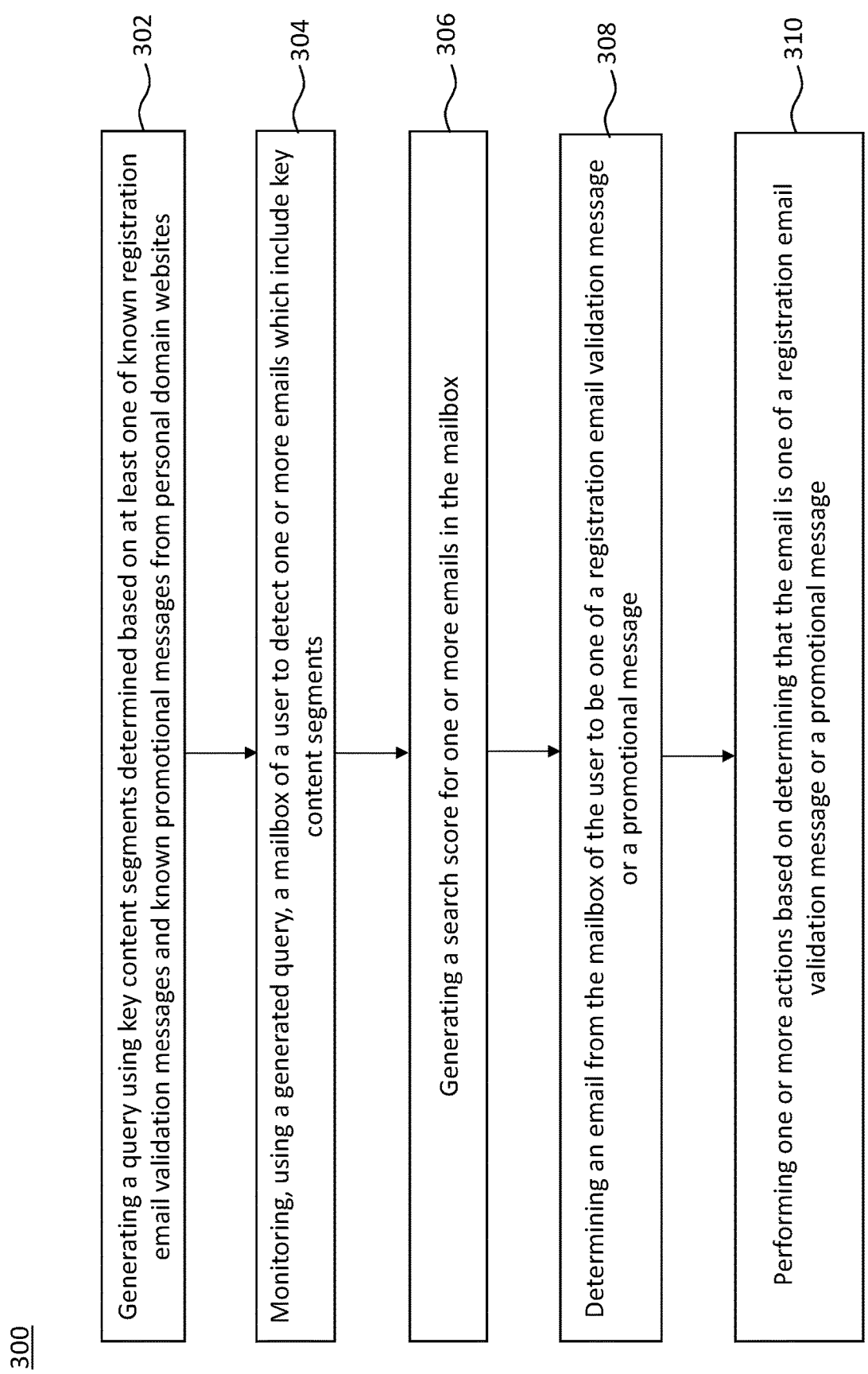
FIG. 3 depicts a flowchart for detecting that the user has registered for a personal domain website using an organization email address, according to some embodiments.

FIG. 3 depicts flowchart 300 for detecting that the user has registered for a personal domain website using an organization email address, according to some embodiments.

Step 302 includes generating a query using key content segments determined based on at least one of known registration email validation messages and known promotional messages from personal domain websites. In an example, registration email validation messages and promotional messages from various personal domain websites may include certain key content segments in common which may be combined and reused to generate a query. In an implementation, key content segments used to build queries in the past may be altered to increase the probability of detecting one or more registration email validation messages and/or promotional message.

In an implementation, detection unit 226 may generate a query of key content segments that appear in the known registration email validation messages and promotional messages from personal domain websites. In an example, detection unit 226 may alter key content segments used to build queries in the past to increase the probability of detecting one or more registration email validation messages and/or promotional messages based on characteristics of known or sample registration email validation messages and/or promotional messages. In an implementation, detection unit 216 may apply an AI model to generate the query.

Step 304 includes monitoring, by detection unit 226 using a generated query, a mailbox of a user to detect one or more emails which include key content segments. In an implementation, detection unit 226 may be configured to monitor one or more or all folders of the mailbox of the user, including for example an inbox folder, a junk email folder, a deleted items folder, and one or more spam email folders. In an implementation, detection unit 226 may be configured to train an AI model to detect one or more emails which include key content segments, for example using sample or known registration email validation messages and/or promotional messages, the AI model to be used for the purpose of recognizing registration email validation messages and/or promotional in a user's mailbox.

Step 306 includes generating, for example by detection unit 226, a search score for one or more emails in the user's mailbox. In examples, the search score is based on key content segments found in the one or more emails. In an implementation, detection unit 226 may generate a search score for all emails found in the user's mailbox. In examples, detection unit 226 may generate a search score for one or more emails found in the user's mailbox that include a minimum number of key content segments.

Step 308 includes determining an email from the mailbox of the user to be one of a registration email validation message or a promotional message based. In examples, detection unit 226 determines one or more emails from the mailbox of the user to be one of a registration email validation message or a promotional message based on the search scores of the one or more emails exceeding a threshold score. In an implementation, detection unit 226 may determine an email from the one or more folders of the mailbox of the user to be one of a registration email validation message or a promotional message based on the search score of the emails exceeding a threshold score. In examples, detection unit 226 may determine that an email from the one or more folders of the mailbox of the user is a registration email validation message based on the search score of the email being less than, equal to, or greater than a first threshold score, and detection unit 226 may determine that an email from the one of more folders of the mailbox of the user is a promotional message based on the search score of the email being less than, equal to, or greater than a second threshold.

Step 310 includes performing one or more actions based on determining that the email is one of a registration email validation message or a promotional message. In examples, the one or more actions may be performed by remediation unit 224. In examples, the one or more actions performed by remediation unit 224 based on determining that the email is one of a registration email validation message or a promotional message. include one or more of deleting the email from the user's mailbox, prompting the user to change an organization password, and providing training to the user on personal domain use of organization login credentials. In an implementation, if detection unit 226 determines that the email is one of a registration email validation message or a promotional message, remediation unit 224 may perform one or more actions separately or in combination. In examples, wherein remediation unit 224 performs more than one action, the more than one actions performed by remediation unit 224 are performed at different times, for example separated by a minimum time period.

In an implementation, if determination unit 226 determines that an email from the one or more folders of the mailbox of the user is a registration email validation message or a promotion message, security awareness system 202 may remove the registration email validation message or the promotional message from the user's mailbox such that the user may not validate the personal domain registration through interacting with the registration email validation message, or such that the user may not interact with the promotional message. In an implementation, responsive to determination unit 226 determining that an email message from the one or more folders of the mailbox of the user is a registration email validation message or a promotional message, security awareness system 202 may prompt or require the user to change their organization password. In some implementations, detection unit 226 may interact with email server 206 and trigger email server 206 to disable the user's organization password and require the user to create a new organization password. In implementations, remediation unit 224 may provide training to the user.

Figure 4:
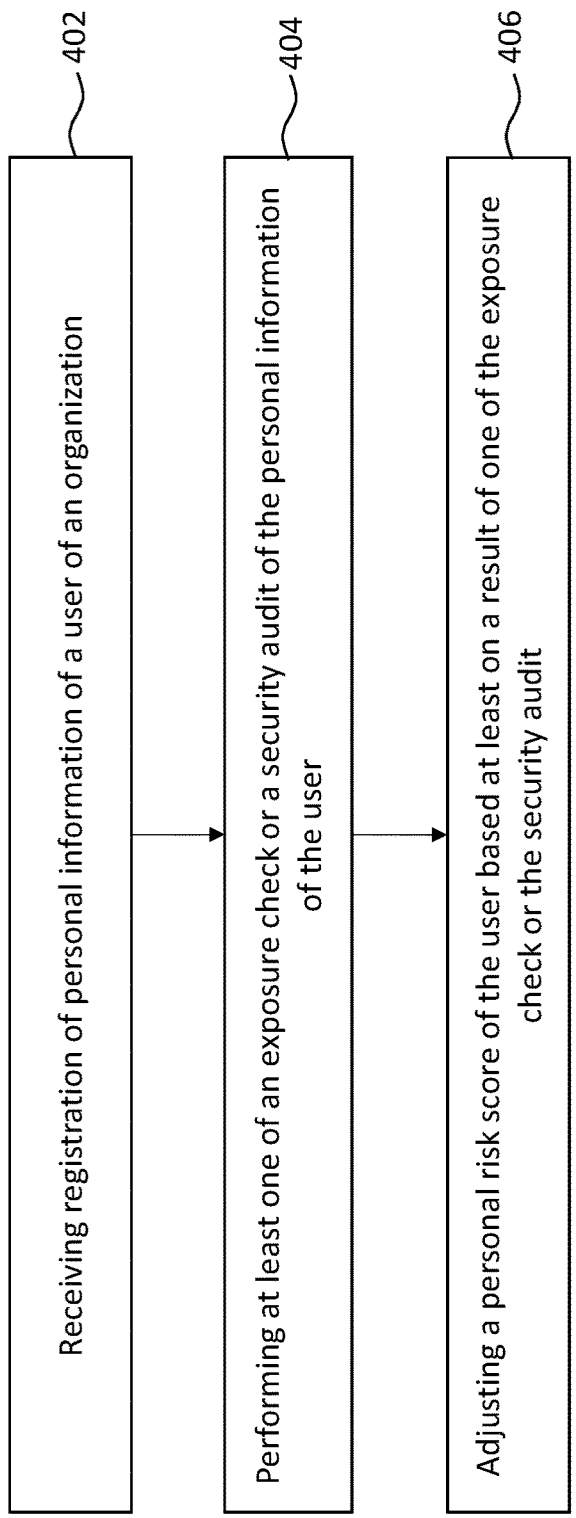
FIG. 4 depicts a flowchart for using personal information for determining the personal risk score of the user of the organization, according to some embodiments.

FIG. 4 depicts flowchart 400 for using personal information for determining a personal risk score of the user of the organization, according to some embodiments.

Step 402 includes receiving registration of personal information of a user of an organization. In an implementation, security awareness system 202 may send a request to the user asking the user to provide his or her personal information. In some embodiments, the user may be asked to voluntarily provide his or her personal information and the user may choose to provide his or her personal information or may choose not to provide his or her personal information. In some embodiments, the user may be required to provide some personal information in order for the user to gain access to one or more services or systems of the organization. Upon receiving a voluntary request, the user may opt to provide the personal information to security awareness system 202. In some embodiments, a user's personal information may include one or more personal email addresses of the user. In some embodiments, a user's personal information may include one or more personal usernames of the user. In some embodiments, a user's personal information may include on or more personal passwords of the user.

Step 404 includes performing at least one of an exposure check or a security audit of the personal information of the user. In an implementation, exposure check unit 218 may be configured to perform an exposure check on some or all of the personal information of the user that was provided by the user. In examples, exposure check unit may perform an exposure check on some or all of the personal information of the user by searching for one or more of a user's personal email address, a user's personal username, or a user's personal password in one or more breach databases 208$_{1-N}$. In examples, exposure check unit 218 may be configured to store the results of one or more exposure checks on the personal information provided by the user in memory, for example memory 214 or risk score storage 232 or personal information storage 230.

In an implementation, security audit unit 220 may be configured to perform a security audit on some or all of the personal information of the user that was provided by the user. In examples, security audit unit 220 performs a security audit of one or more personal passwords of the user by assessing a strength of the one or more personal passwords of the user. In examples, security audit unit 220 performs a security audit of one or more personal passwords of the user by comparing the one or more personal passwords of the user to password requirements of the organization. In examples, security audit unit 220 may be configured to store the results of one or more security audits on personal information provided by the user in memory, for example memory 214 or risk score storage 232 or personal information storage 230.

Step 406 includes adjusting a personal risk score of the user based at least on a result of one or more of an exposure check and/or a security audit on personal information provided by the user. In an implementation, risk score calculator 222 may be configured to generate a personal risk score for a user based at least on the result of one of an exposure check or a security audit on personal information provided by the user. In an implementation, risk score calculator 222 may be configured to adjust a previously determined personal risk score of a user based at least on the result of one of the exposure check or the security audit on personal information provided by the user. According to an embodiment, risk score calculator 222 may adjust the personal risk score of the user based at least on the user voluntarily registering personal information with security awareness system 202. In an implementation, risk score calculator 222 may determine a risk score for a user based at least on the personal risk score of the user.

FIG. 5 depicts flowchart 500 for performing a remedial training or a simulated phishing campaign directed to the user based on a personal risk score of the user, according to some embodiments.

Step 502 includes receiving personal information of a user of an organization, for example as described previously in step 402 of FIG. 4. In an implementation, security awareness system 202 may send a request to the user to provide his or her personal information. Upon receiving the request or otherwise, the user may opt to provide personal information to security awareness system 202. In some examples, the personal information provided by the user of the organization includes one or more personal email addresses.

Step 504 includes verifying a user's personal email address is used in a personal domain of the user. In an implementation, verification unit 216 may verify the email address identified by the personal information and used in the personal domain of the user by attempting to login in to the personal domain with one or more of the personal email addresses provided by the user.

Step 506 includes storing the personal information of the user in response verification unit 216 verifying that one or more personal email address of the user has been used in the personal domain of the user. In an implementation, verification unit 216 may be configured to store the personal information of the user in response to the email address used in the personal domain of the user being verified. In an implementation, verification unit 216 may store the email address used in the personal domain of the user in user personal information storage 230. In an example, the email address may be stored in an encrypted or obfuscated form.

In an implementation verification unit 216 may associate the email address used in the personal domain of the user with a security awareness profile stored in risk score storage 232. In some examples, access to the one or more personal email addresses of the user stored in user personal information storage 230 may be limited to some services or systems of the user's organization.

Step 508 includes performing at least one of an exposure check or a security audit of the personal information of the user, for example as was described in step 404 of FIG. 4. In an implementation, exposure check unit 218 may be configured to perform the exposure check by searching using at least one personal email address or personal username of the user provided by the user in the user's personal information in one or more breach databases $208_{1-N}$. Further, in an implementation, security audit unit 220 may be configured to perform a security audit by assessing a strength of one or more personal passwords from the user's personal information and compliance of the one or more personal passwords of the user to the password requirements of the organization.

Step 510 includes adjusting a personal risk score of the user based at least on a result of one of the exposure check or the security audit, for example as described in step 406 of FIG. 4. In an implementation, risk score calculator 222 may be configured to adjust the personal risk score of the user based at least on the result of one of the exposure check or the security audit. According to an embodiment, risk score calculator 222 may adjust the personal risk score of the user based at least on the user's registration of the personal information with security awareness system 202. Also, in an implementation, risk score calculator 222 may determine an overall risk score for the user based at least on the personal risk score of the user.

Step 512 includes performing one of a remedial training or a simulated phishing campaign directed to the user based on the personal risk score of the user. In an implementation, remediation unit 224 may be configured to perform one or more remedial training and security awareness system 202 may be configured to perform one or more simulated phishing campaign directed to the user based on a set level, an increase, or a decrease in the user's personal risk score.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   receiving, by a security awareness system configured on one or more servers, from a user of an organization registration of personal information;
   performing, by the security awareness system, at least one of an exposure check against one or more breach databases or a security audit of the personal information of the user; and
   adjusting, by the security awareness system, a personal risk score of the user based at least on a result of one of the exposure check or the security audit, the personal risk score comprising at least a component representing a willingness of the user to provide the personal information to the organization to which the user is not obliged to provide the personal information; and
   performing, by the security awareness system based on at least the personal risk score of the user, one of a computer-based remedial training or a simulated phishing campaign directed to the user.

2. The method of claim 1, further comprising verifying, by the security awareness system, an email address as used in a personal domain of the user.

3. The method of claim 2, further comprising storing, by the security awareness system, the email address used in the personal domain of the user in association with a profile of the user for the security awareness system.

4. The method of claim 2, further comprising registering the personal information with the security awareness system responsive to the email address used in the personal domain of the user being verified.

5. The method of claim 1, further comprising storing, by the security awareness system, the personal information in an obfuscated form.

6. The method of claim 1, further comprising performing the exposure check by searching using at least one of an email address or a username in the personal information for breached user information in the one or more breach databases.

7. The method of claim 1, further comprising performing the security audit by assessing a strength of one or more registered personal passwords from the personal information and compliances to password requirements of the organization.

8. The method of claim 1, further comprising adjusting the personal risk score of the user based at least on the user's registration of the personal information with the security awareness system.

9. The method of claim 1, further comprising determining, by the security awareness system, a risk score based at least on the personal risk score of the user.

10. The method of claim 1, further comprising monitoring, by the security awareness system, the one or more breach databases for the personal information.

11. A system comprising:
    a security awareness system configured on one or more processors, coupled to memory, the security awareness system configured to:
    receive from a user of an organization registration of personal information;
    perform at least one of an exposure check against one or more breach databases or a security audit of the personal information of the user;
    adjust a personal risk score of the user based at least on a result of one of the exposure check or the security audit, the personal risk score comprising at least a component representing a willingness of the user to provide the personal information to the organization to which the user is not obliged to provide the personal information; and
    perform, based on at least the personal risk score of the user, one of a computer-based remedial training or a simulated phishing campaign directed to the user.

12. The system of claim 11, wherein the security awareness system is further configured to verify an email address as used in a personal domain of the user.

13. The system of claim 12, wherein the security awareness system is further configured to store the email address used in the personal domain of the user in association with a profile of the user for the security awareness system.

14. The system of claim 12, wherein the security awareness system is further configured to register the personal information responsive to the email address used in the personal domain of the user being verified.

15. The system of claim 11, wherein the security awareness system is further configured to store the personal information in an obfuscated form.

16. The system of claim 11, wherein the security awareness system is further configured to perform the exposure check by searching using at least one of an email address or a username in the personal information for breached user information in the one or more breach databases.

17. The system of claim 11, wherein the security awareness system is further configured to perform the security audit by assessing a strength of one or more registered personal passwords from the personal information and compliances to password requirements of the organization.

18. The system of claim 11, wherein the security awareness system is further configured to adjust the personal risk score of the user based at least on the user's registration of the personal information with the security awareness system.

19. The system of claim 11, wherein the security awareness system is further configured to determine a risk score based at least on the personal risk score of the user.

20. The system of claim 11, wherein the security awareness system is further configured to monitor the one or more breach databases for the personal information.

* * * * *